United States Patent [19]

Hermann et al.

[11] 4,277,379

[45] Jul. 7, 1981

[54] FLAME RESISTING COMPOSITION

[75] Inventors: Gerson Hermann, Westfield; Babubhai C. Patel; Sudhakerbhai B. Patel, both of Edison, all of N.J.

[73] Assignee: Apex Chemical Company, Inc., Elizabethport, N.J.

[21] Appl. No.: 96,673

[22] Filed: Nov. 23, 1979

[51] Int. Cl.$^3$ .............................................. C09K 3/28
[52] U.S. Cl. .................................. 252/608; 8/128 R; 427/389
[58] Field of Search ................ 8/128 R; 252/8.1, 608; 427/389

[56] References Cited

U.S. PATENT DOCUMENTS

| | | | |
|---|---|---|---|
| 2,547,671 | 4/1951 | Sostmann et al. | 252/8.1 |
| 2,986,445 | 5/1961 | Koenig | 8/128 |
| 3,079,215 | 2/1963 | Koenig | 8/128 |
| 3,097,052 | 7/1963 | Koenig | 8/128 |
| 3,351,419 | 11/1967 | Fell et al. | 8/17 |
| 3,751,454 | 8/1973 | Minami et al. | 252/8.1 |
| 3,927,962 | 12/1975 | Friedman et al. | 8/128 R X |
| 4,007,006 | 2/1977 | Friedman et al. | 8/128 R |
| 4,098,704 | 7/1978 | Sandler | 252/8.1 |

OTHER PUBLICATIONS

Friedman et al., Textile Research Journal, vol. 44, No. 12, Dec. 1974, pp. 994 to 996.
Friedman et al., Proceedings, Fifth International Wool Textile Conference, vol. 5, Held in Aachen Sept. 2 to 11, 1975, pp. 47 to 54.

*Primary Examiner*—Leland A. Sebastian
*Attorney, Agent, or Firm*—William H. Elliott, Jr.

[57] ABSTRACT

The disclosure is concerned with a composition of matter comprising an aqueous paste of a substantially monobasic tetrachloro or tetrabromphthalate salt in finely divided form as the dispersed phase and sufficient quantities of a dispersing agent and a thickener to prevent agglomeration and settling of the dispersed phase. Preferably the monobasic salt is one that is derived from a halophthalic acid or from a halophthalic anhydride by reaction with an alkaline base wherein the quantity of base used is from 0.7 to 1.2 equivalents of the base per mole of halophthalic acid or halophthalic anhydride. The quantity of the monobasic phthalic salt can comprise from 5 to 65% of the weight of the paste. The paste is useful for imparting enhanced flame resistance to wool.

20 Claims, No Drawings

FLAME RESISTING COMPOSITION

This invention relates to a composition of matter that is useful for imparting enhanced flame resistance to wool.

As used herein, wool shall mean wool per se, modified wools (such as chlorinated wool, resinated wool, shrink resistant wool) and to blends of the foregoing with the natural and/or synthetic fibers wherein wool is a substantial fiber component of the textile undergoing treatment.

U.S. Pat. No. 3,927,962 and a paper by the patentees entitled Dyebath Application of Flame Retardants for Flame Resistant Wool, Friedman et al, *Textile Research Journal*, Vol. 44, pp. 994–6, disclose that tetrabromophthalic anhydride, a compound known to be effective as a flame retardant for wool, could be simultaneously or sequentially applied to wool from the same bath being used to dye the wool. The tetrabromophthalic anhydride is added to the bath either as an homogenized slurry of the anhydride per se or as a solution of tetrabromophthalic acid.

Several different modes of application are disclosed. In one method, the bromophthalic anhydride is dispersed in water together with a dispersing agent and then passed through a Gaulin Homogenizer. The dispersion at 140° F. is pumped through the yarn in a package dyeing machine. After the yarn has been treated in this way for 5 minutes, a concentrated solution of the dye is added and the system brought to the boil. On completion of the dyeing cycle, the yarn is rinsed, extracted and dried.

In the other method, Method B of the Friedman paper, the anhydride is solubilized by reaction with NaOH, precipitated by the addition of sulfuric acid and added to the dye bath at the boil as a precipitate. The exact procedure employed is not spelled out in sufficient detail to say just what the precipitate is, and it also is not clear whether the dye was present, and if so, when it was added, in the so-called dyebath of Method B. In any event, and because of the complicated manipulative techniques required of the operator—usually a semi-skilled laborer lacking in technical training—in order to prepare the dispersion so that it will readily dissolve under the conditions prevailing in the dye bath, it is very difficult to duplicate results and precisely match shades. Therefore, these techniques have not found widespread commercial acceptance, even though the concept has many desirable attributes.

Tetrabromophthalic anhydride cannot be maintained as a concentrated aqueous dispersion or emulsion of finely divided particles, the anhydride will hydrolyze and crystallize as the acid form and settle and harden into a mass that must be physically disintegrated before the slurry can be re-established. Tetrabromophthalic acid is very expensive (as compared to the anhydride); it is only sparingly soluble in water at room temperature.

Techniques are not known that will enable suspending and/or emulsifying the "anhydride" form or provide concentrated solutions of the "acid" form so that they could be marketed, stored and used as a concentrate that can be added to the dyebath without additional processing (other than mere dilution) to reconstitute the slurry or solution.

It is an object of this invention to provide a suspension or paste of very finely divided particles of a tetrahalophthalic acid derivative having a high solids concentration and in a form that can be stored for prolonged periods without agglomeration or settling and that can be easily dispersed in water and will readily be dissolved under the acidic conditions prevailing in dye bath of the type conventionally employed to dye wool.

It is a further object of this invention that the tetrahalophthalic acid derivative can be added to the dyebath without requiring the operator to perform additional complex manipulative operations to insure the dispersion and dissolution in the dye bath.

These objects and advantages are obtained in accordance with this invention by a composition of matter comprising an aqueous paste of a substantially monobasic tetrachloro- or tetrabromophthalate salt in finely divided form as the dispersed phase, and sufficient quantities of a dispersing agent and a thickener to prevent agglomeration and settling of the dispersed phase. Preferably, the monobasic phthalate salt is one that is derived from a halophthalic acid or from a halophthalic anhydride by reaction with an alkaline base wherein the quantity of the base used is from 0.7 to 1.2 equivalents (desirably about 1 equivalent) of the quantity of the base per mole of halophthalic acid or halophthalic anhydride. The quantity of the monobasic phthalate salt can comprise from 5 to 65 percent, and preferably from about 35 to 65 percent by weight of the paste.

Where prolonged storage is contemplated, the composition should also include one or more hydroscopic additives or humectants that are capable of retaining water in the system.

Suitable alkaline bases for neutralizing or reacting with the halophthalic acid or anhydride include the alkali metal bases, ammonium bases and the mono-, di- and trialkanol amine bases. The preferred bases include sodium, potassium, lithium and ammonium carbonates, bicarbonates or hydroxides and the lower alkyl ($C_1$ to $C_5$) alkanol amines such as 2-amino-methyl-propanol and triethanol amine.

Suitable dispersing agents for use in the flame resistant compositions of this invention are the anionic dispersing agents that are conventionally used in the textile industry to disperse finely divided particulate materials. They are used in conventional amounts, usually in concentrations of about 0.1 to 5 percent by weight of the paste; a preferred dispersing agent is the sodium salt of a formaldehyde-naphthalene sulfonic acid condensate.

Desirably, the system should also include a emulsifying agent in order to maintain the dispersion and assist in diluting the paste prior to adding the paste to the bath and to provide a uniform consistency in the paste. Preferred emulsifying agents for use in the formulation of this invention are the non-ionic alkoxylated aryl polymers and in amounts that provide for about 1 to 10 percent of weight of the paste.

Thickeners that are suitable for purposes of this invention are the salt-tolerant natural or synthetic gums that are capable of functioning as a thickener in strongly acidic environments such as pHs from about 1 to 4.5, and especially at a pH of about 2. Such thickeners include gum tragacanth, guar gum, the cellulose alkyl ethers, alginates and Xanthan gums (natural biopolysaccharides). The thickeners are employed in such quantities as are needed to maintain consistency of the dispersion and prevent agglomeration and settling of the dispersed phase. Usually, the exact quantity can vary widely. However, most thickeners can function effectively in a range from about ¼ to 5 percent by weight of the paste.

Suitable humectants for use in accordance with the invention include polyhydricalcohols, such as sorbitol or dextrins and the lower molecular weight polyalkylene glycols particularly those having a molecular weight of between about 100 and 1500. Such products are used in quantities needed to maintain the softness of the dispersion by retaining water in the system and by preventing the rapid evaporation of the water from air-exposed surfaces that occur when the container is opened during handling. The humectant however, is not an essential component of any formulation that is to be totally consumed promptly after preparation.

To prepare the formulation or composition of this invention, one can start from either the halophthalic anhydride or the halophthalic acid. The acid or anhydride is initially dispersed in water and reacted with the theoretical quantity of alkaline base that is needed to form the corresponding monobasic salt. This material is then blended with the quantities of additives, such as the dispersing agents, emulsifiers, thickeners and humectants as required for preserving the consistency of the paste, preventing agglomeration and settling of the dispersed particles on storage, and assist in diluting the paste when more dilute forms are desired.

We have also found that it is frequently desirable to include in the formulation small quantities of triethanolamine as this material appears to assist in maintaining the softness of the suspension.

The total quantity of the paste conditioning additives can vary widely depending on the particular additives employed. Thus, they can comprise from 5 to 25 parts by weight of the paste and such quantities normally do not exert any adverse effect on the intended utilization of the paste in the treatment of wool to enhance its flame resistance. For reasons of economy and effectiveness of performance, it is preferred to employ these additives in amounts whose total weight comprises from 10 to 15 parts by weight of the paste.

The formulations disclosed herein are not only useful in the simultaneous dyeing and imparting of enhanced flame resistance to wool according to the techniques of the aforementioned Friedman patent and paper, but also are highly useful in connection with the Process For Modifying Wool To Render It Flame Resistant disclosed in the commonly owned co-pending application Ser. No. 96,757 filed concurrently herewith by Gerson Hermann, Babubhai C. Patel and Emil Baer. The examples of this application will also be found in said co-pending application. The disclosures, specification and claims of said application are expressly incorporated herein by reference.

In this application, the terms "phthalate salt", "monobasic tetrahalophthalate salt", etc, have sometimes been used when referring to the halophthalic derivative that is the dispersed phase of the composition. A more precise name for the derivatives being designated by those terms is "the monobasic salt of tetrahalophthalic acid or tetrahalophthalic anhydride".

The following examples will serve to further illustrate the presently preferred method of practicing the invention, and the preparation of materials that are useful therein. In the examples, parts are by weight and temperatures are in Fahrenheit unless otherwise stated.

EXAMPLE 1

(Preparation of the Potassium tetrabromophthalate salt paste)

A stainless steel kettle equipped with good agitation, heating and cooling was charged with 100 lbs. of water, 20 lbs. of polyethylene glycol (M.W. 200), 2½ lbs. of triethanolamine, 42½ lbs. of a non-ionic emulsifying agent (alkoxylated aryl polymer) and 40 lbs. of sorbitol. After mixing was complete, 10 lbs. of an anionic dispersing agent (the sodium salt of a formaldehyde-naphthalane sulfonic acid condensate) was added and the mixture stirred until all these additions were dissolved. With continued stirring, 500 lbs. of tetrabromophthalic anhydride were then added and mixed until uniformily dispersed. 121½ lbs. of 45 percent KOH were then added. The reaction was exothermic. The mix was then heated to about 90°–95° C. and stirring continued at 90°–95° C. until a smooth soft uniform paste was formed. The mix was then cooled to 75° C. and 163½ lbs. of a 2.6 percent Xanthan gum solution was added, the mix stirred until uniform and water added as necessary to make 1000 lbs. of paste. The resultant product was a smooth soft uniform paste of 65–66 percent solids, pH 2–3. A 5 percent aqueous dispersion of this product also had a pH of 2–3. One percent of the paste added to boiling water gave an almost clear solution with a pH of 2–3.

The following examples illustrate a one bath method of dyeing wool with 1:1 premetallized dyes (Example 2) and acid leveling dyes (Example 3) and simultaneously imparting flame resistance by exhausting a monobasic tetrahalophthalic acid on to the wool. In these examples, the dyeing and flame resisting treatment is followed by an aftertreatment to enhance the resistance of the flame retardant to wet treatments and dry cleaning.

EXAMPLE 2

Wool fabric cut selvage to selvage weighing 4 lbs. was scoured in a conventional manner in a bath at 120° F. containing (based on fabric weight) 1 percent nonionic surfactant and 1 percent soda ash at 140° F. for 20 minutes and then rinsed and neutralized.

The scoured wool was then transferred to a dyebath, the dyebath was set at 120° F. and a 30:1 liquor to wool ratio. Sulfuric acid was added to bring pH of the bath to 2. When pH was stabilized at 2, the temperature was raised to 160° F. and the following were added:

1.8% (owf) Acid Black 52—C.I. No. 15711
0.3% (owf) Acid Red 194
0.3% (owf) Acid Blue 158A—C.I. No. 15050
10.0% (owf) Glauber's Salt The dyebath was run for 5 minutes; the temperature was raised to 160° F. and then 15 percent (owf) of Phthalate Paste from Example 1 (prediluted-1 part of paste to 10 parts of water) was added.

The bath temperature was raised to the boil and the dyebath was run for 60 minutes. The bath was then cooled to 140° F.; 3 percent (owf) of the 1-phenol-2-sulfonic acid formaldehyde condensate fixative solution of Example 4 was then added and the bath was run for 30 minutes at 140° F. The bath was then dropped and the aftertreated fabric rinsed with cold water and then dried.

EXAMPLE 3

A 100 percent wool fabric weighing 600 grams was scoured in a bath containing 1 percent (owf) non-ionic surfactant and 1 percent (owf) soda ash for 20 minutes at 165° F. and then rinsed in cold water and set in a fresh bath at 30:1 (liquor to fabric ratio) and a temperature at 120° F. Sulfuric acid was added to bring the pH of the bath to 2. After the pH was stabilized at 2, then the following were added:

1.33% (owf) Acid Red 1 (C.I. No. 18050)
0.65% (owf) Acid Yellow 17 (C.I. No. 18965)
10.00% (owf) Glauber's Salt and the temperature raised to 160° F. 15 percent (owf) of the Phthalate Paste of Example 1 was then added to the bath, and the bath temperature raised to and held at the boil for 60 minutes. The bath was then cooled to 150° F., and sulfuric acid added as necessary to maintain pH at 2. 3 percent (owf) of the 1-phenol-2-sulfonic formaldehyde condensate fixative solution of Example 4 was then added and the bath run for 30 minutes at 140°-150° F. The bath was then flooded with cold water and dropped. The treated fabric was then rinsed cold and frame dried at 250° F.

EXAMPLE 4

(Preparation of 1-phenol-2-sulfonic formaldehyde condensate fixative solution)

A stainless steel kettle equipped with good agitation, heating, cooling and ventilation was charged with water (36 lbs.), 45 percent KOH (13½ lbs.) and mixed. Phenol (169 lbs.) was melted, added to the kettle with care and mixed until uniform. The charge was heated to 80° C. and 37 percent formaldehyde (146 lbs.) was added while maintaining the temperature at 85°-90° C. The temperature was then raised to and maintained at 90°-95° C. for 45 minutes. Glacial acedic acid (6½ lbs.) was then added to drop the pH to 4. Sodium metabisulfite (67 lbs.) was then added, the mix held at 90°-95° C. for 75 minutes, and then cooled to 50°-55° C. 85 percent phosphoric acid (25 lbs.) was then added. The temperature was raised to 90° C. and held at 90°-95° C. until 2-3 drops of the product gave an opalescent solution in 20 cc of 2 percent aqueous NaCl. When this point was reached, water (144 lbs.) was added and the batch cooled below 75° C. KOH was then added to adjust the pH to 6-6.5 and water was added to adjust the solids content to 32-33 percent.

The solution was then cooled below 50° C. The resultant product was a clear dark yellow to amber thin liquid, pH 6-6.5.

EXAMPLE 5

An unscoured wool/nylon blend (70/30) was set in the dyebath with water at 120° F. Sulfuric acid was added as necessary to bring pH to 2. After the pH was stabilized, at 2, the temperature of the bath was raised to 160° F. and 20 percent (owf) of the Phthalate Paste of Example 1 (prediluted—1 part paste to 10 parts water) was then added. The temperature of the bath was then raised to the boil, the bath was run for 60 minutes and then cooled to below 175° F. Both the fabric and the bath were then split into 5 equal parts. The fabric in Bath #1 was merely removed, rinsed and dried.

To baths #2-5, 0.3 percent, 0.6 percent, 0.9 percent and 1.2 percent (owf) of the fixative of Example 4 were added and the aftertreatment was carried out for 15 minutes at 175°-185° F. The baths were then cooled, the fabrics removed, rinsed and dried.

The fabrics from Baths #1-5 were scoured in a 20:1 water:fabric ration bath containing 0.1 percent (on weight solution—"ows") non-ionic detergent and 0.1 percent (ows) sodium carbonate for 5 minutes at 140° F. The fabrics were then rinsed and dried.

The fabrics were tested by the flame retardancy test method NFPA-701, Revised 1976, Flame-Resistant Textiles and Films. The results were as follows:

| Bath | NFPA 701 % Fixative (owf) | Char length (inches) | Afterflame (sec.) | Afterglow (sec.) |
|---|---|---|---|---|
| #1 | 0 | Burned entire length (BEL) | | |
| #2 | 0.3 | 3 | 4½ | 0 |
| | | 2¾ | 2 | 0 |
| #3 | 0.6 | 2½ | 1½ | 0 |
| | | 2¼ | 2 | 0 |
| #4 | 0.9 | 2¼ | 1 | 0 |
| | | 2 | 1 | 0 |
| #5 | 1.2 | 2½ | 3 | 0 |
| | | 3 | 3 | 0 |

EXAMPLE 6

A nylon wool (70/30) blend was pretreated with phthalate paste and the bath was cooled as described in Example 5. The fabrics were then removed, rinsed and dried.

Portions of the pretreated fabric were then subjected to aftertreatment with various fixatives and one portion (the control) was not aftertreated.

The aftertreatments were carried in separate baths containing water and:
Fabric #1 6% (owf) sodium bichromate
Fabric #2 1.5% (owf) colloidal antimony oxide
Fabric #3 0.6% (owf) Condensate of Example 4.

In each case 4 percent (owf) 66° Be sulfuric acid was present in the aftertreating bath to adjust pH to about 2. The temperature was raised to 185° F. and held for 15 minutes. The baths were cooled, the fabrics were removed, rinsed, scoured, dried and tested as in Example 5. A portion of the control fabric was also scoured as described in Example 5. The results are tabulated in Table 2.

TABLE 2

| Fabric | Fixative | NFPA - 701 % Fixative (owf) | Char Length (inches) | Afterflame (sec.) | Afterglow (sec.) |
|---|---|---|---|---|---|
| Control (unscoured) | none | none | 2½ | 0 | 0 |
| | | | 3 | 0 | 0 |
| Control (scoured) | none | none | Burned entire length (BEL) | | |
| #1 | Bichromate | 6 | 2¼ | 1½ | 0 |
| | | | 2¾ | 3 | 0 |
| #2 | Antimony Oxide | 1.5 | 3¼ | 2½ | 0 |
| | | | 3¼ | 4 | 0 |

TABLE 2-continued

| | | NFPA - 701 | | | |
|---|---|---|---|---|---|
| Fabric | Fixative | % Fixative (owf) | Char Length (inches) | Afterflame (sec.) | Afterglow (sec.) |
| #3 | Example 4 Condensate | 0.6 | 2¾ | 2 | 0 |
| | | | 2¾ | 2 | 0 |

We claim:

1. A composition of matter comprising an aqueous paste of a substantially monobasic tetrachloro or tetrabromophthalate salt in finely divided form as the dispersed phase and sufficient quantities of a dispersing agent and a thickener to prevent agglomeration and settling of the dispersed phase.

2. A composition according to claim 1 wherein the dispersed phase comprises from 5 to 65 percent by weight of the paste.

3. A composition according to claim 1 wherein the dispersed phase comprises from 35 to 65 percent by weight of the paste.

4. A composition according to any of claims 1 to 3 wherein a substantially monobasic tetrabromophthalate salt is the dispersed phase.

5. A composition according to claim 1 wherein the monobasic phthalate salt is derived from a halophthalic acid or from a halophthalic anhydride by reaction with a base and wherein the quantity of base reacted is from 0.7 to 1.2 equivalents of the base per mole of halophthalic acid or halophthalic anhydride.

6. A composition according to claim 5 wherein the base that is reacted with the halophthalic acid or anhydride is an alkali metal base, an ammonium base or a mono, di or trialkanol amine base.

7. A composition according to claim 6 wherein the base that is reacted with the halophthalic acid or anhydride is an alkali metal or ammonium carbonate, bicarbonate or hydroxide.

8. A composition according to claim 7 wherein the base is sodium, potassium or ammonium hydroxide.

9. A composition according to claim 1 wherein the paste also contains a non-ionic emulsifying agent.

10. A composition according to claim 9 wherein the emulsifying agent is an alkoxylated aryl polymer.

11. A composition according to claim 1 or 5 wherein the thickener is a salt tolerant natural or synthetic gum that can function as a thickener at a pH below about 4.5.

12. A composition according to claim 10 wherein the thickener is selected from the group gum tragacanth, guar gum, cellulose alkyl ethers, alginates, and xanthan gum.

13. A composition according to claim 11 wherein the thickener is a xanthan gum.

14. A composition according to any of claims 1, 5 or 12 containing a humectant capable of retaining water in the system.

15. A composition according to claim 14 wherein the humectant is a low molecular weight polyethylene glycol.

16. A composition according to claim 14 wherein the humectant is sorbitol.

17. A composition of matter comprising an aqueous paste containing about 50 to 60 parts by weight of a monopotassium tetrabromophthalate in finely divided form prepared by reacting tetrabromophthalic acid or tetrabromophthalic anhydride with about 1 equivalent of a basic potassium compound per moles of tetrabromophthalic acid or anhydride, said paste also containing as additives, a dispersing agent, a thickener, an emulsifier and a humectant in such quantities as are necessary to maintain the consistency of the paste, and water to make 100 parts.

18. A composition according to claim 16 wherein the total of combined weight of the additives constitutes from about 5 to 25 parts.

19. A composition according to claim 16 wherein the total of combined weight of the additives constitutes from about 10 to 15 parts.

20. A composition of matter comprising an aqueous paste containing by weight.
   50 parts tetrabromophthalic anhydride reacted with
   5.5 parts potassium hydroxide and further containing
   2 parts polyethylene glycol (M.W. 200)
   0.25 parts triethanolamine
   4.2 parts alkoxylate aryl non-ionic dispersant 2.8 parts sorbitol
   1.0 parts sodium salt of a condensed formaldehydenaphthalene sulfonic acid
   0.4 parts xanthan gum
and water to make 100 parts.

* * * * *